Patented May 20, 1930

1,759,152

UNITED STATES PATENT OFFICE

CHARLES F. BOOTH AND ARTHUR B. GERBER, OF ANNISTON, ALABAMA, AND PAUL LOGUE, OF ST. LOUIS, MISSOURI, ASSIGNORS TO FEDERAL PHOSPHORUS COMPANY, OF BIRMINGHAM, ALABAMA, A CORPORATION OF ALABAMA

SODIUM BORATE TRI-SODIUM PHOSPHATE COMPOUND AND PROCESS FOR ITS MANUFACTURE

No Drawing.  Application filed October 28, 1927. Serial No. 229,525.

This invention relates to the manufacture of compounds of alkali-metal phosphate, and particularly to a new sodium borate tri-sodium phosphate compound, such as falls generally within the class of products forming the subject of our copending application, Serial No. 726,920, and to the process for its manufacture.

This application in its process phase is a continuation in part of our application, Serial No. 726,919, now U. S. Patent No. 1,688,112, wherein we have described and claimed a process for the production of a neutral tri-sodium phosphate, i. e., one produced by the use of less caustic soda so that the resulting compound would have a "ratio" of 0.50 when titrated with a standard acid, using phenolphthalein and methyl orange as indicators. During the experiments from which the last mentioned invention resulted, it was discovered that a new definite compound could be produced from the neutral tri-sodium phosphate solution by the addition of sodium borate, and that such addition improved the crystallization of the resulting tri-sodium phosphate compound. It will therefore be seen that this new compound and its production by our process offers distinct economic advantages over the manufacture of alkaline or commercial tri-sodium phosphate as produced heretofore, and in addition to this economic feature, a sodium borate tri-sodium phosphate compound is produced which will have distinct advantages as a detergent and water softener, in that it will not have the same harsh caustic drying action on the skin.

The process and equipment of manufacture of this new compound are those similar to that carried on and used in the manufacture of alkaline or commercial tri-sodium phosphate, such as is found on the market at present. According to our process, phosphoric acid is neutralized with sodium carbonate ($Na_2CO_3$) to di-sodium phosphate, and caustic soda is added in a quantity sufficient to convert the di-sodium phosphate to tri-sodium phosphate according to the chemical equation,

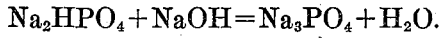

$$Na_2HPO_4 + NaOH = Na_3PO_4 + H_2O.$$

Borax is then added to the solution in such a quantity that after dilution with water the solution will have a specific gravity of 1.32 and contain approximately 8% of borax. When borax is thus added to the solution in substantially the proportions outlined, a sodium borate-tri-sodium-phosphate compound of crystalline form is obtained when the solution is cooled.

The amount of sodium borate varies according to the titration "ratio," more sodium borate being required with a high "ratio." The titration "ratio" varies from approximately 0.46 to 0.50, before the addition of the borax, depending upon the concentration of the solution, a high "ratio" being used for higher concentrations. After the addition of the borax the ratio will vary from 0.50 to 0.54. The crystals obtained from this solution will have an alkalinity expressed by the relation of the phenolphthalein titration to the methyl orange titration of from 0.57 to 0.59.

After the sodium borate-tri-sodium phosphate solution is tested as described above, it is cooled in any suitable manner and the sodium borate-tri-sodium phosphate crystals separate out. They may be dried in a centrifuge or any other suitable means of dewatering, and then steam or air dried to remove the surface moisture. After drying, the crystals are ready for shipment.

The following proportions are given as illustrative of the materials required in making 100 lbs. of the above described sodium borate tri-sodium phosphate compound by our process:—

30# 60% $H_3PO_4$ (18# $H_3PO_4$).
19.6# commercial soda ash (58% $Na_2O$).
7.5# caustic soda (76% $Na_2O$).
16.0# sodium borate.

The acid is neutralized by the soda ash and any impurities such as iron, alumina, and calcium phosphates which are precipitated, are removed from the solution, preferably by filtration. The di-sodium phosphate solution is boiled prior to filtration in order that the carbon dioxide ($CO_2$) may be eliminated.

After filtration sodium borate and caustic soda are added and the solution thoroughly mixed. The mixture is then tested as follows. This caustic soda requirement or "ratio" in producing solutions for crystallization may be judged by a method of control in which the sodium borate tri-sodium phosphate solution is titrated with a half normal hydrochloric acid solution using phenolphthalein and methyl orange as indicators. When the end point for the phenolphthalein is reached, a reading is made of the acid used, and the titration is continued to a slight acid end point with the methyl orange. The reading of the titration of the phenolphthalein is then divided by the sum of the readings, and a "ratio" of 0.46 to 0.50 is the desired resultant for the optimum conditions to produce the best yield of sodium borate tri-sodium phosphate crystals when the solution is cooled.

According to the previously outlined method, if sufficient caustic has not been added, an addition is made until the titration gives the desired figure; while if an excess of caustic has been added, di-sodium phosphate solution is added to reduce the figure to the desired point. The same equipment can be used for the subsequent cooling, crystallization, dewatering and drying of this product as for the alkaline or commercial tri-sodium phosphate as found on the market at present. When we refer to alkaline or commercial tri-sodium phosphate as found on the market at present, we means to include its compounds, whatever the composition may be.

Having thus described our invention, what we claim as new and desire to secure by Letters Patent, is:—

1. The herein described composition of matter consisting of a compound of sodium phosphate and sodium borate.

2. The herein described composition of matter consisting of a compound of tri-sodium phosphate and sodium borate.

3. The herein described composition of matter consisting of tri-sodium phosphate and sodium borate in a crystalline form.

4. The herein described tri-sodium phosphate composition containing approximately 16% sodium borate.

5. The herein described composition of matter consisting of tri-sodium phosphate and sodium borate having an alkalinity expressed by the relation of phenolphthalein titration and methyl orange titration of from 0.57 to 0.59.

6. In the herein described process for the manufacture of a sodium borate tri-sodium phosphate composition, the step which comprise combining phosphoric acid, sodium carbonate, and caustic soda with sodium borate and water.

7. The herein described process for the manufacture of a sodium borate tri-sodium phosphate composition, which consists in combining phosphoric acid, sodium carbonate, and caustic soda with sodium borate and water and cooling the solution and separating out the sodium borate tri-sodium phosphate composition in crystalline form.

8. The herein described process for the manufacture of a sodium borate tri-sodium phosphate composition, which consists in combining concentrated phosphoric acid, sodium carbonate, and caustic soda with sodium borate and water and cooling the solution and separating out the sodium borate tri-sodium phosphate composition in crystalline form.

9. The herein described process for the manufacture of a sodium borate tri-sodium phosphate composition, which consists in the addition of caustic soda and sodium borate to di-sodium phosphate, substantially as described.

10. The herein described steps in the process for the manufacture of a sodium borate tri-sodium phosphate composition, which consists in neutralizing phosphoric acid with sodium carbonate, removing all solids thus formed, adding caustic soda and sodium borate, and cooling and crystallizing the sodium borate tri-sodium phosphate composition, substantially as described.

11. The herein described process for the manufacture of a sodium borate tri-sodium phosphate composition, which consists in adding caustic soda and sodium borate to di-sodium phosphate solution, and cooling and crystallizing a sodium borate tri-sodium phosphate compound therefrom, substantially as described.

In testimony whereof we affix our signatures.

CHARLES F. BOOTH.
ARTHUR B. GERBER.
PAUL LOGUE.